(12) United States Patent
Ice (10) Patent No.: US 7,625,137 B2
(45) Date of Patent: Dec. 1, 2009

(54) COMMUNICATIONS DEVICE (75) Inventor: Donald A. Ice, Millpitas, CA (US)

(73) Assignee: Finisar Corporation, Sunnyvale, CA (US)

( * ) Notice: Subject to any disclaimer, the term of this patent is extended or adjusted under 35 U.S.C. 154(b) by 0 days.

(21) Appl. No.: 11/960,550

(22) Filed: Dec. 19, 2007

(65) Prior Publication Data
US 2008/0145006 A1 Jun. 19, 2008

Related U.S. Application Data (60) Provisional application No. 60/870,806, filed on Dec. 19, 2006, provisional application No. 60/870,807, filed on Dec. 19, 2006.

(51) Int. Cl.
G02B 6/42 (2006.01)

(52) U.S. Cl. .......................................... 385/92; 385/89

(58) Field of Classification Search ....................... None
See application file for complete search history.

(56) References Cited

U.S. PATENT DOCUMENTS

| | | | |
|---|---|---|---|
| 4,215,937 A | 8/1980 | Borsuk | |
| 4,911,519 A | 3/1990 | Burton et al. | |
| 6,302,596 B1 | 10/2001 | Cohen et al. | |
| 6,494,736 B2 | 12/2002 | Mito | |
| 6,652,158 B2 | 11/2003 | Bartur et al. | |
| 6,712,527 B1 | 3/2004 | Chan et al. | |
| 6,744,639 B1* | 6/2004 | Branch et al. | 361/818 |
| 6,749,448 B2 | 6/2004 | Bright et al. | |
| 6,832,856 B2 | 12/2004 | Chiu et al. | |
| 6,873,800 B1* | 3/2005 | Wei et al. | 398/138 |
| 7,300,215 B2 | 11/2007 | Hsiao et al. | |
| 7,367,719 B1* | 5/2008 | Liburdi | 385/92 |
| 2002/0110336 A1* | 8/2002 | Dair et al. | 385/92 |
| 2002/0136501 A1 | 9/2002 | Yen et al. | |
| 2003/0020998 A1 | 1/2003 | Kuczynski | |
| 2003/0072540 A1 | 4/2003 | Huang | |
| 2003/0147230 A1 | 8/2003 | Hultermans et al. | |
| 2003/0156802 A1* | 8/2003 | Togami et al. | 385/92 |
| 2003/0171022 A1* | 9/2003 | Distad et al. | 439/372 |
| 2003/0185525 A1 | 10/2003 | Lacy et al. | |
| 2004/0264887 A1 | 12/2004 | Rosenberg et al. | |

(Continued)

FOREIGN PATENT DOCUMENTS

JP 16012672 1/2004

(Continued)

OTHER PUBLICATIONS

U.S. Appl. No. 11/693,674, filed Mar. 29, 2007, Donald A. Ice.

(Continued)

*Primary Examiner*—Mike Stahl
(74) *Attorney, Agent, or Firm*—Workman Nydegger (57) ABSTRACT

A communications device may include a connector block. The connector block may include a port. The port may be sized and configured to couple an optical fiber plug. The communications device may include an optical subassembly that may be connected to the connector block. The connector block may include a mount. The mount may be sized and configured to align the connector block and the optical subassembly. The mount may be configured as an EMI shield.

6 Claims, 6 Drawing Sheets

U.S. PATENT DOCUMENTS

| | | | |
|---|---|---|---|
| 2005/0213871 A1* | 9/2005 | Schwiebert et al. | 385/14 |
| 2005/0286839 A1* | 12/2005 | Yoshikawa | 385/92 |
| 2006/0045436 A1 | 3/2006 | Wang et al. | |
| 2006/0093281 A1 | 5/2006 | Kesler | |
| 2006/0093287 A1* | 5/2006 | Yoshikawa et al. | 385/92 |
| 2006/0281357 A1 | 12/2006 | Chen et al. | |
| 2007/0058911 A1* | 3/2007 | Yu et al. | 385/92 |
| 2008/0298750 A1 | 12/2008 | Landry et al. | |
| 2008/0298752 A1 | 12/2008 | Teo et al. | |

FOREIGN PATENT DOCUMENTS

| | | |
|---|---|---|
| JP | 17275407 | 10/2005 |
| JP | 18106751 | 4/2006 |
| JP | 18106752 | 4/2006 |
| JP | 18108684 | 4/2006 |
| JP | 18259731 | 9/2006 |

OTHER PUBLICATIONS

U.S. Appl. No. 11/693,679, filed Mar. 29, 2007, Donald A. Ice.
U.S. Appl. No. 11/693,681, filed Mar. 29, 2007, Donald A. Ice.
U.S. Appl. No. 11/693,687, filed Mar. 29, 2007, Donald A. Ice.
U.S. Appl. No. 11/960,530, filed Dec. 19, 2008, Donald A. Ice.
U.S. Appl. No. 11/693,687, filed Jan. 24, 2008, Office Action.
U.S. Appl. No. 11/693,674, filed Feb. 21, 2008, Office Action.
U.S. Appl. No. 11/693,681, filed Mar. 4, 2008, Office Action.
U.S. Appl. No. 11/960,530, filed Apr. 3, 2008, Office Action.
U.S. Appl. No. 11/693,674, filed Sep. 10, 2008, Final Office Action.
U.S. Appl. No. 11/693,681, filed Jun. 2, 2008, Office Action.
United States Patent and Trademark Office, Examiner Tho Dac Ta, U.S. Appl. No. 11/693,687, Notice of Allowance and Fees Due, mailed Sep. 26, 2008.
United States Patent and Trademark Office, Examiner Michael J. Stahl, U.S. Appl. No. 11/693,674, Notice of Allowance and Fees Due, mailed Feb. 6, 2009.
United States Patent and Trademark Office, Examiner Daniel Petkovsek, U.S. Appl. No. 11/693,681, Notice of Allowance and Fees Due, mailed Feb. 10, 2009.
United States Patent and Trademark Office, Examiner Jerry T. Rahll, U.S. Appl. No. 11/960,530, Office Action mailed Dec. 29, 2008.
United States Patent and Trademark Office, Examiner Yuriy Semenenko, U.S. Appl. No. 11/693,679, Office Action mailed Mar. 5, 2009.
Written Opinion of the International Searching Authority, and International Search Report, International Application No. PCT/US2007/088229, Mailing date: May 23, 2008.

* cited by examiner

COMMUNICATIONS DEVICE

CROSS-REFERENCE TO RELATED APPLICATIONS

This application claims priority to, and the benefit of, U.S. provisional patent application Ser. No. 60/870,806, filed on Dec. 19, 2006.

This application claims priority to, and the benefit of, U.S. provisional patent application Ser. No. 60/870,807, filed on Dec. 19, 2006.

BACKGROUND

1. Field of the Invention

The present invention generally relates to communications devices.

2. Background Technology

A conventional optical transceiver may include a transmitter optical subassembly ("TOSA") and a receiver optical subassembly ("ROSA"), which are typically positioned within a housing of the transceiver. Some conventional optical transceivers may suffer from poor wiggle performance. In addition, it may be difficult to align the transceivers' transmitter and receiver optical subassemblies with the transceivers' ports. This, in turn, may make it difficult to align the transmitter and receiver optical subassemblies with the optical fibers of an optical fiber connector coupled to the transceiver, which may prevent or otherwise negatively affect communication via the optical fibers. In addition to these problems, conventional optical transceivers may undesirably produce electromagnetic interference ("EMI").

SUMMARY

A need therefore exists for a communications device that eliminates or reduces the disadvantages and problems listed above and/or other disadvantages and problems.

One aspect is an apparatus that may comprise an optical subassembly. The optical assembly may comprise a front portion that may include an end; and a nosepiece that may be configured to convey optical signals. The nosepiece may extend away from the end of the front portion. The apparatus may also comprise a connector block, which may be connected to the optical subassembly. The connector block may comprise a monolithic body including a port that may be sized and configured to couple an optical fiber plug. The connector block may also comprise an EMI shield, which may be connected to the monolithic body and to the optical subassembly. The EMI shield may include a recessed portion. The recessed portion may include an end and an opening, which may be formed in the end. The end of the recessed portion may abut the end of the front portion of the optical subassembly. The nosepiece of the optical subassembly may extend through the opening formed in the end of the recessed portion.

Another aspect is an apparatus that may comprise a transmitter optical subassembly, a receiver optical subassembly, a first monolithic body, a first EMI shield, a second monolithic body, and a second EMI shield. The transmitter optical subassembly may comprise a front portion that may include an end; and a nosepiece that may be configured to convey optical signals. The nosepiece of the transmitter optical subassembly may extend away from the end of the front portion of the transmitter optical subassembly. The receiver optical subassembly may comprise a front portion that may include an end; and a nosepiece that may be configured to convey optical signals. The nosepiece of the receiver optical subassembly may extend away from the end of the front portion of the receiver optical subassembly. The first monolithic body may include a port that is sized and configured to couple an optical fiber plug. The second monolithic body may include a port that is sized and configured to couple an optical fiber plug. The first EMI shield may be connected to the first monolithic body and to the transmitter optical subassembly. The first EMI shield may include a recessed portion that may include an end and an opening formed in the end. The end of the recessed portion of the first EMI shield may abut the end of the front portion of the transmitter optical subassembly. The nosepiece of the transmitter optical subassembly may extend through the opening formed in the end of the recessed portion of the first EMI shield. The second EMI shield may be connected to the second monolithic body and to the receiver optical subassembly. The second EMI shield may include a recessed portion that may include an end and an opening formed in the end. The end of the recessed portion of the second EMI shield may abut the end of the front portion of the receiver optical subassembly. The nosepiece of the receiver optical subassembly may extend through the opening formed in the end of the recessed portion of the second EMI shield.

Yet another aspect is an apparatus that may include a transmitter optical subassembly, a receiver optical subassembly, a first body, a first EMI shield, a second body, and a second EMI shield. The transmitter optical subassembly may include a nosepiece configured to convey optical signals. The receiver optical subassembly may include a nosepiece configured to convey optical signals. The first body may include a port that is sized and configured to couple an optical fiber plug. The first EMI shield may be connected to the first body and may include an opening and one or more resilient members. The nosepiece of the transmitter optical subassembly may extend through the opening of the first EMI shield. The second body may include a port that is sized and configured to couple an optical fiber plug. The second EMI shield may be connected to the second body and may include an opening and one or more resilient members. The nosepiece of the receiver optical subassembly may extend through the opening of the second EMI shield. At least one resilient member of the second EMI shield may contact at least one resilient member of the first EMI shield.

For purposes of summarizing, some aspects, advantages and features of a few of the embodiments of the invention have been described in this summary. Some embodiments of the invention may include some or all of these summarized aspects, advantages and features. However, not necessarily all of (or any of) these summarized aspects, advantages or features will be embodied in any particular embodiment of the invention. Thus, none of these summarized aspects, advantages and features are essential. Some of these summarized aspects, advantages and features and other aspects, advantages and features may become more fully apparent from the following detailed description and the appended claims.

BRIEF DESCRIPTION OF THE DRAWINGS

The appended drawings contain figures of preferred embodiments to further clarify the above and other aspects, advantages and features. It will be appreciated that these drawings depict only preferred embodiments of the invention and are not intended to limit its scope. These preferred embodiments will be described and explained with additional specificity and detail through the use of the accompanying drawings in which.

DETAILED DESCRIPTION

One or more embodiments of the present invention are generally directed towards communications devices. The principles of the embodiments of the present invention, however, are not limited to communications devices. It will be understood that, in light of the present disclosure, the communications devices disclosed herein can be successfully used in connection with other types of devices.

Figures 1, 2:
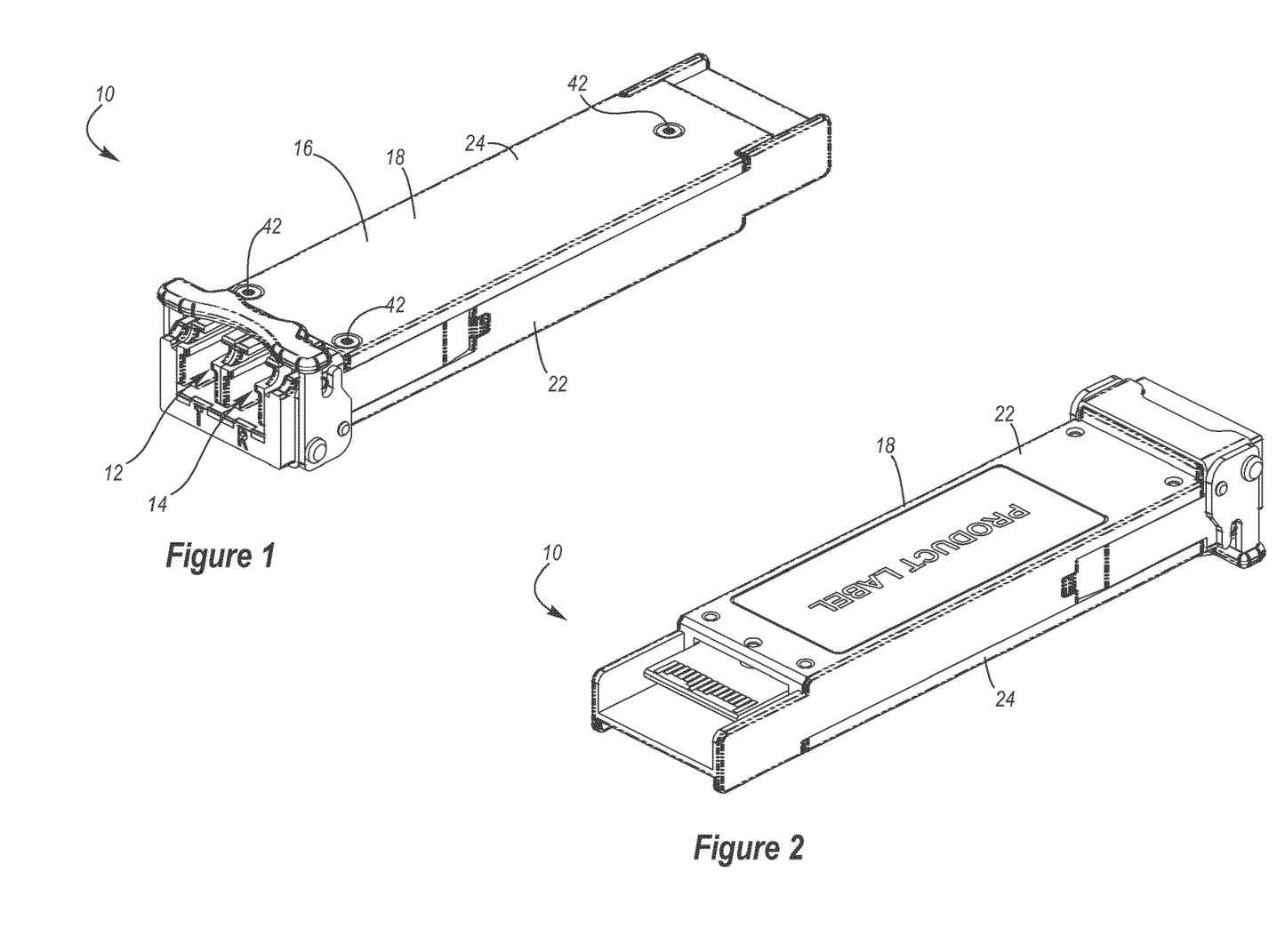
FIG. 1 is an upper perspective view of an exemplary communications device.
FIG. 2 is a lower perspective view of the communications device shown in FIG. 1.

As shown in FIGS. 1-2, a communications device 10 may be a transceiver, such as an optical transceiver module or other suitable transceiver module. For instance, the communications device 10 may be an XFP transceiver and may be configured to use longwave optical signals to communicate. The communications device 10, however, need not be an XFP transceiver and may be configured to use other types of signals to communicate. Moreover, the communications device 10 need not be a transceiver and may be a transmitter, a receiver or any other suitable communications device.

The communications device 10 may include one or more ports. For example, as shown in FIG. 1, the communications device 10 may include a port 12, a port 14, or both. The port 12 may comprise an optical transmit port or any other suitable type of transmit port, and the port 14 may comprise an optical receive port or any other suitable type of receive port. If desired, the communications device 10 may include a single port that may be a transmit port, a receive port or both a transmit port and a receive port. Of course, the communications device 10 may include any number of ports and/or type of port depending, for example, upon the particular configuration of the communications device 10.

In some embodiments, as shown in FIG. 1, the port 12 and/or the port 14 may comprise sockets that may be sized and configured to receive and/or couple at least a portion of a plug. In particular, the port 12 may comprise an optical fiber socket that may be sized and configured to receive and/or couple at least a portion of an optical fiber plug, and the port 14 may comprise an optical fiber socket that may be sized and configured to receive and/or couple at least a portion of an optical fiber plug. For example, the ports 12, 14 may comprise optical fiber sockets (such as, LC-type optical fiber sockets or other optical fiber sockets) that may be sized and configured to receive and/or couple at least a portion of an optical fiber plug (such as, an LC-type optical fiber plug or other optical fiber plug) of an optical fiber connector to which the communications device 10 may be coupled—which may permit optical signals to be sent and/or received via the ports 12, 14.

In some embodiments, however, the port 12 and/or the port 14 may comprise plugs that may be sized and configured to be at least partially inserted into and/or coupled by a socket. In particular, the port 12 may comprise an optical fiber plug that may be sized and configured to be at least partially inserted into and/or coupled by an optical fiber socket, and the port 14 may comprise an optical fiber plug that may be sized and configured to be at least partially inserted into and/or coupled by an optical fiber socket. For example, the ports 12, 14 may comprise optical fiber plugs that may be sized and configured to be at least partially inserted into and/or coupled by an optical fiber socket of an optical fiber connector to which the communications device 10 may be coupled—which may permit optical signals to be sent and/or received via the ports 12, 14.

The ports 12, 14, however, need not comprise optical sockets or optical plugs and may comprise other types of sockets or plugs. Moreover, the ports 12, 14 need not comprise sockets or plugs and may comprise other suitable structures depending, for example, upon the particular configuration of the ports 12, 14.

Figure 3:
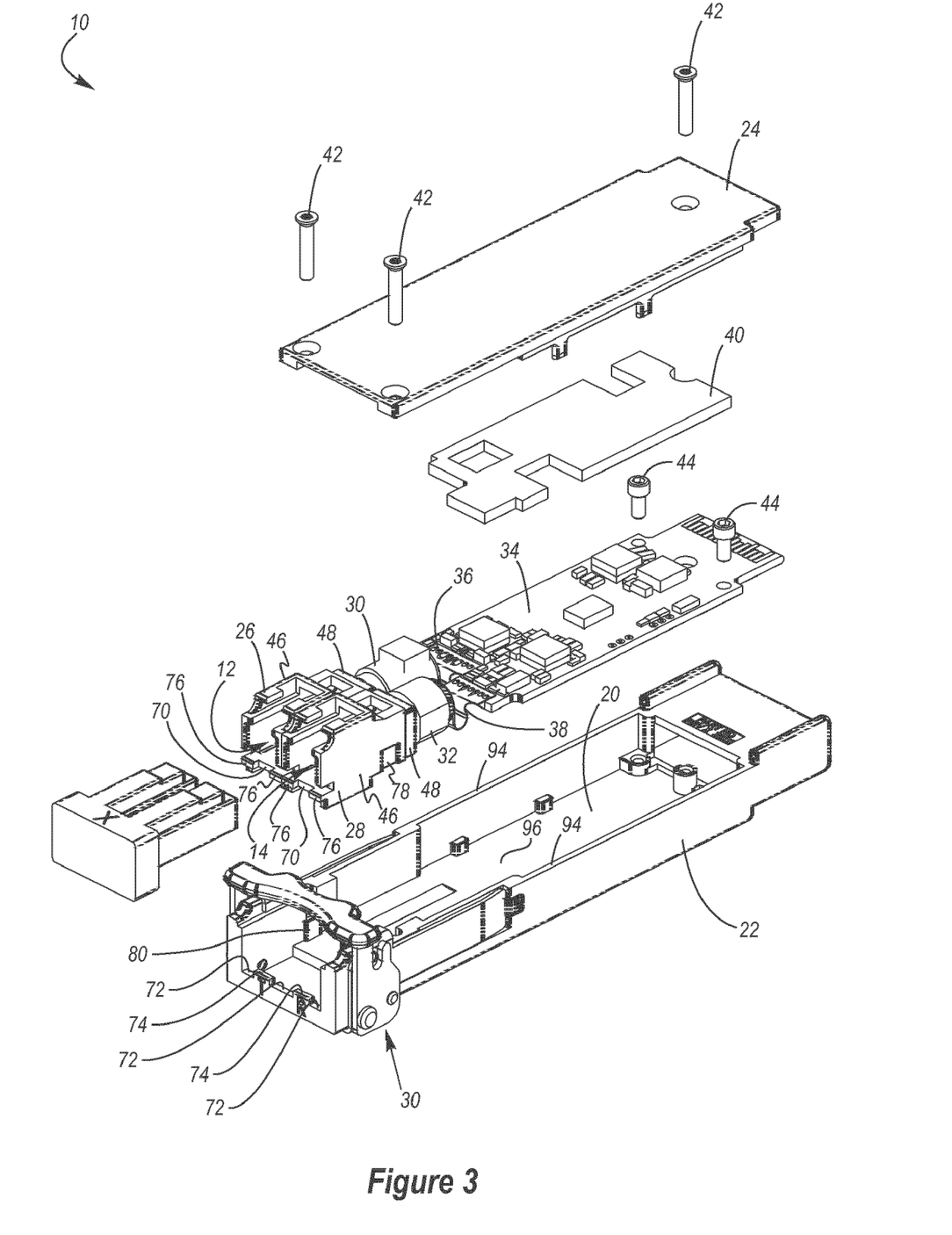
FIG. 3 is a partially exploded view of the communications device shown in FIG. 1.

As shown in FIGS. 1-3, the communications device 10 may include a body 16, which may include a housing 18 sized and configured to house at least a portion of one or more components of the communications device 10. In particular, the housing 18 may include a cavity 20 that may be sized and configured to receive at least a portion of one or more components of the communications device 10. For example, the housing 18 may include a shell 22 and a cover 24, and the shell 22 may include the cavity 20, as shown in FIG. 3.

In further detail, as shown in FIG. 3, the communications device 10 may include one or more connector blocks, such as connector blocks 26, 28; one or more optical subassemblies, such as a transmitter optical subassembly ("TOSA") 30 and a receiver optical subassembly ("ROSA") 32; one or more printed circuit boards ("PCB"), such as printed circuit board 34; one or more flex circuits, such as flex circuits 36, 38; one or more microwave absorber pads, such as a microwave absorber pad 40; one or more other components; or any combination thereof. The microwave absorber pad 40 may include one or more openings through which a heat sink formed in the cover 24 of the housing 18 may extend to contact, abut and/or engage the printed circuit board 34. Desirably, one or more of the connector block 26; the connector block 28; the transmitter optical subassembly 30; the receiver optical subassembly 32; the printed circuit board 34; the flex circuit 36; the flex circuit 38; the microwave absorber pad 40 and/or other components may be at least partially disposed within the cavity 20 depending, for example, upon the particular configuration of the communications device 10.

Figure 4:
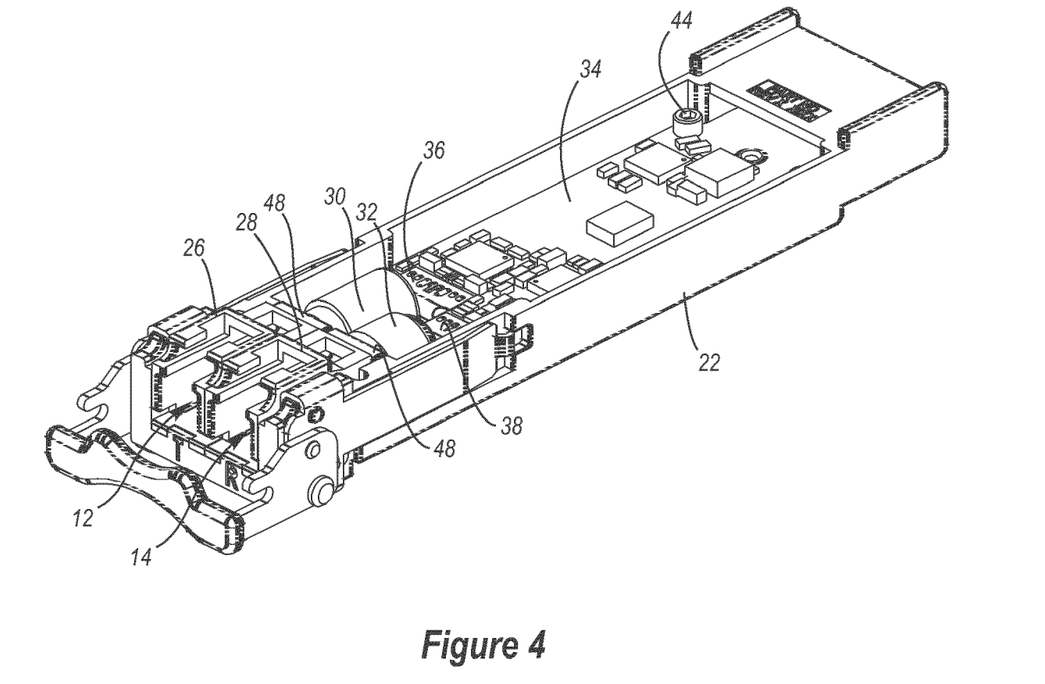
FIG. 4 is a front perspective view of a portion of the communications device shown in FIG. 1.
Figure 5:
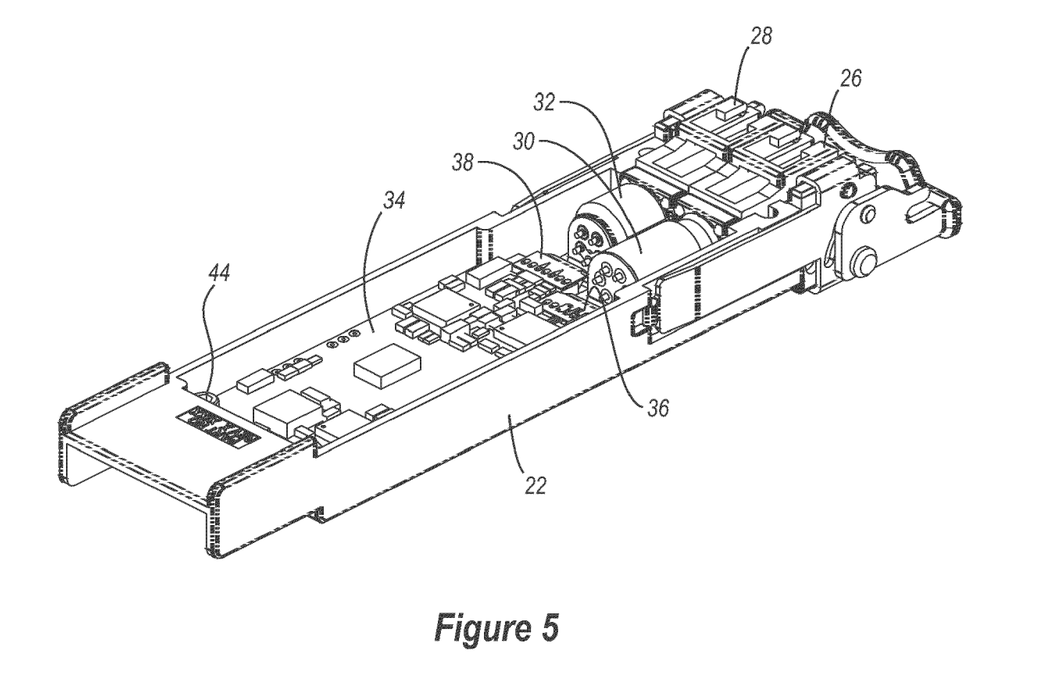
FIG. 5 is a rear perspective view of a portion of the communications device shown in FIG. 4.

With one or more of components of the communications device 10 at least partially disposed within the cavity 20, for example as shown in FIGS. 4-5, the cover 24 may be connected to the shell 22 to help at least partially enclose these components within the housing 18, for example as shown in FIGS. 1-2. The cover 24 may be connected to the shell 22 using one or more fasteners 42 (such as screws or other fasteners); a snap fit, a friction fit and/or an interference fit; one or more adhesives; and/or any other suitable means. The housing 18, of course, does not require the shell 22 or the cover 24 and may include other suitable components. Moreover, the communications device 10 does not require any housings 18; connector blocks 26, 28; optical subassemblies 30, 32; printed circuit boards 34; flex circuits 36, 38; or microwave absorber pads 40 and may include other suitable components.

As shown in FIGS. 4-5, the printed circuit board 34 may be connected to a portion of the housing 18, for example, the shell 22. The printed circuit board 34 may be connected to the housing 18 using one or more fasteners 44 (such as screws or other fasteners); a snap fit, a friction fit and/or an interference fit; one or more adhesives; and/or any other suitable means.

As shown in FIGS. 4-5, the optical subassemblies 30, 32 may be connected to the flex circuits 36, 38, respectively, and the flex circuits 36, 38 may be connected to the printed circuit board 34 to interconnect the printed circuit board 34 and the optical subassemblies 30, 32. The connector blocks 26, 28, which are discussed in further detail below, may be connected to the optical subassemblies 30, 32, respectively.

Figure 6:
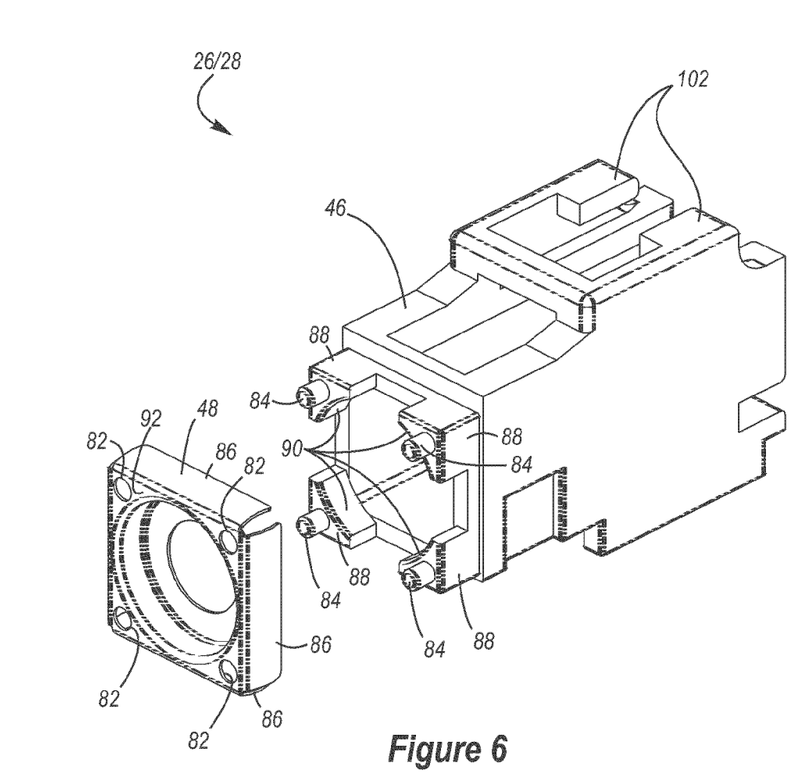
FIG. 6 is an exploded view of a portion of the communications device shown in FIG. 1, illustrating an exemplary connector block.

As shown in FIG. 3, all or at least a portion of the ports 12, 14 may be formed or otherwise included in the connector blocks 26, 28, respectively. In particular, as shown in FIGS. 3 and 6-7, a connector block 26, 28 may include a body 46, and all or at least a portion of the ports 12, 14 may be formed or otherwise included in the bodies 46 of the connector blocks 26, 28, respectively.

The body 46 of a connector block 26, 28 may be constructed from metal and may be a monolithic body. For example, the body 46 may be formed as a monolithic body via a die-casting process using zinc and/or one or more other suitable metals. The body 46, however, need not be constructed from metal and may be constructed any suitable materials. In addition, the body 46 need not be constructed using a die-casting process and may be formed using any suitable manufacturing process. Moreover, the body 46 need not have a monolithic construction.

As shown in FIGS. 6-9, a connector block 26, 28 may include a mount 48, which may be sized and configured to interconnect and/or align the connector block 26, 28 and an optical subassembly 30, 32. For example, the mount 48 and the connector block 26, 28 may include one or more generally complementary portions and/or other portions that may facilitate the connection and/or alignment of the connector block 26, 28 and the optical subassembly 30, 32. In particular, the generally complementary portions and/or other portions of the mount 48 and the optical subassembly 30, 32 may contact, abut, engage and/or be connected to each other, which may facilitate such connection and/or alignment.

Figure 7:
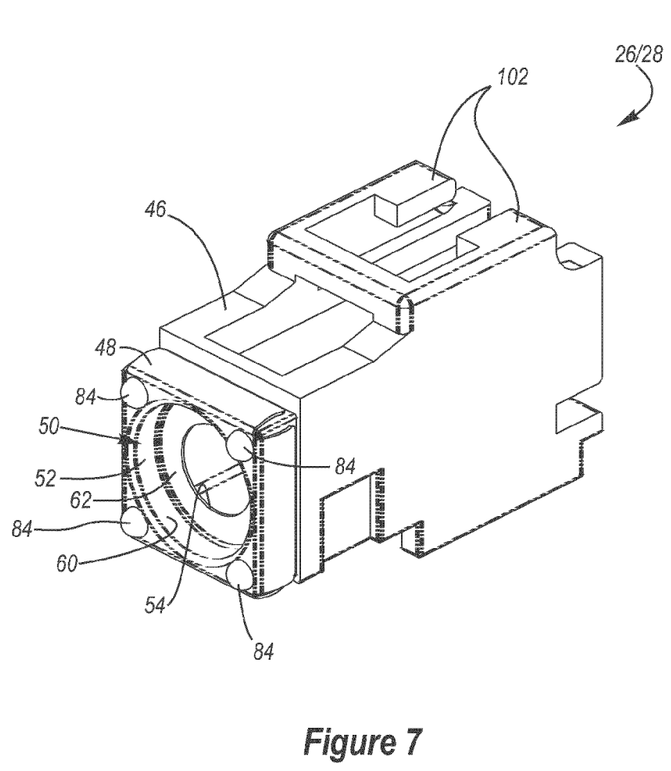
FIG. 7 is a perspective view of the connector block shown in FIG. 6.
Figure 8:
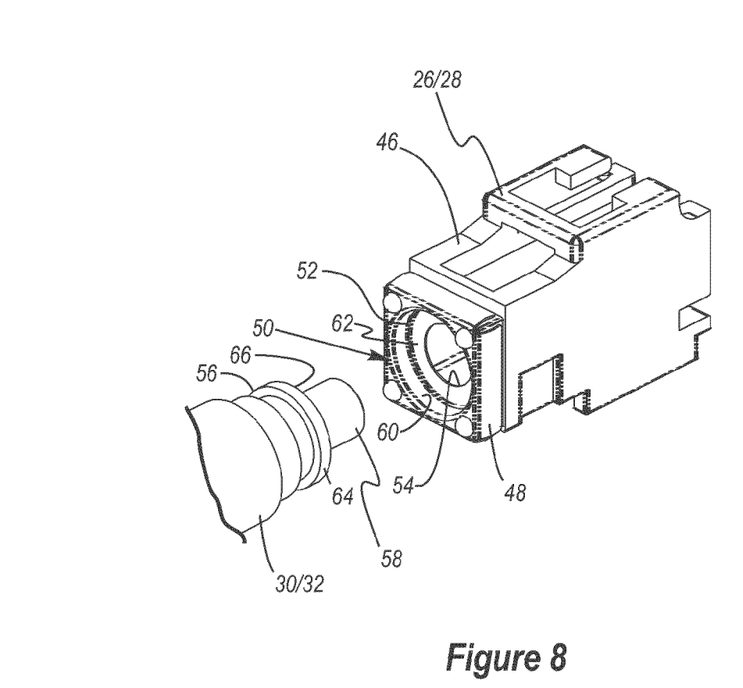
FIG. 8 is an exploded view of a portion of the communications device shown in FIG. 1.
Figure 9:
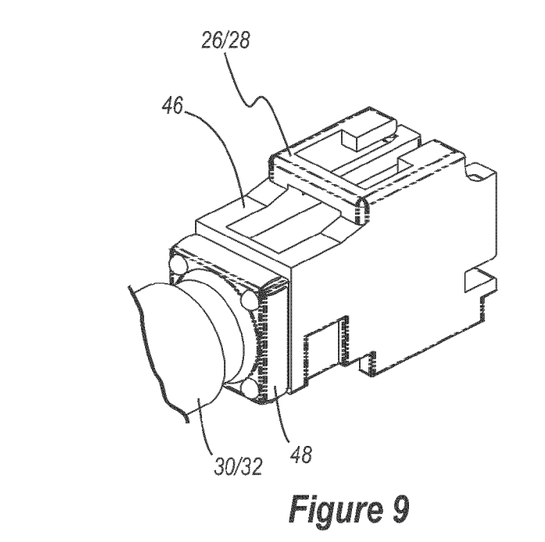
FIG. 9 is a perspective view of the portion of the communications device shown in FIG. 8.

In further detail, as shown in FIGS. 7-8, the mount 48 may include a receptacle 50 that may include a recessed portion 52, and a portion of the optical subassembly 30, 32 may contact, abut, engage and/or be connected to the recessed portion 52. The receptacle 50 may include an opening 54, and a portion of the optical subassembly 30, 32 may extend through the opening 54. In particular, as shown in FIG. 7, the optical subassembly 30, 32 may include a front portion (such as a flange 56) and a nosepiece 58 configured to convey optical signals—for instance, convey outgoing optical signals in the case of a transmitter optical subassembly 30 or convey incoming optical signals in the case of a receiver optical subassembly 32. The nosepiece 58 may extend away from the front portion, and as shown in FIG. 9, the nosepiece 58 may be inserted into the opening 54. In addition, the recessed portion 52 and the flange 56 may be generally complementary and/or may contact, abut, engage and/or be connected to each other. For instance, as shown in FIG. 7, the recessed portion 52 may include a side 60 and an end 62, and as shown in FIG. 8, the flange 56 may include a side 64 and an end 66. As shown in FIGS. 8-11, the recessed portion's side 60 and end 62 may be generally complementary to the flange's side 64 and end 66 and may contact, abut, engage and/or be connected to the flange's side 64 and end 66.

As shown in FIG. 9, an optical subassembly 30, 32 may be connected to a connector block 26, 28. The optical subassembly 30, 32 may be connected to the connector block 26, 28 using an adhesive, such as, a heat-cured epoxy, other epoxies or other adhesives. For example, the flange 56 of the optical subassembly 30, 32 may be connected to the mount 48 of the connector block 26, 28 using an adhesive. In particular, the adhesive may be used to connect the flange's side 64 and/or end 66 to the recessed portion's side 60 and/or end 62, respectively. Thus, if desired, one or more portions of the adhesive may be sandwiched between the flange's side 64 and the recessed portion's side 60 and/or between the flange's end 66 and the recessed portion's end 62. Of course, other portions of the optical subassembly 30, 32 may be connected to other portions of the connector block 26, 28. Moreover, the optical subassembly 30, 32 may be connected to the connector block 26, 28 using one or more fasteners; a snap fit, a friction fit and/or an interference fit; one or more adhesives; and/or any other suitable means.

In one embodiment, a jig may be used to facilitate connection of the optical subassembly 30, 32 to the connector block 26, 28. In particular, the jig may include a ferrule portion, and the ferrule portion of the jig may be inserted into and/or through an optical path 68 (FIG. 11) of the connector block 26, 28. The optical subassembly 30, 32 may then brought into contact with the connector block 26, 28 via pressure applied by the jig—which may cause the optical subassembly's nosepiece 58 to contact the ferrule portion of the jig and/or which may position the optical subassembly's nosepiece 58 at least partially within the port 12, 14 of the connector block 26, 28. Because of the jig's configuration and contact with the nosepiece 58, bringing the optical subassembly 30, 32 into contact with the connector block 26, 28 may align its nosepiece 58 with respect to the port 12, 14 of the connector block 26, 28. The optical subassembly 30, 32 may then be secured to the connector block 26, 28 using an adhesive, for example, as discussed above. Prior to this securing, any adjustment to the alignment of the nosepiece 58 relative to the port 12, 14 may be made.

While this jig and this process may be used to connect the optical subassembly 30, 32 to the connector block 26, 28, this jig and this process are not required. Thus, the connector block 26, 28 and the optical subassembly 30, 32 may be connected to each other using other suitable structures and/or other manufacturing processes.

After connecting the optical subassemblies 30, 32 to the connector blocks 26, 28, the optical subassemblies 30, 32 may be coupled to the printed circuit board 34, for example, by connecting the flex circuits 36, 38 to the optical subassemblies 30, 32 and/or the printed circuit board 34. This structure of the connector blocks 26, 28; optical subassemblies 30, 32; the printed circuit board 34; and the flex circuits 36, 38 may then be placed within the cavity 20 of the housing 18 and/or connected to the housing 18 using one or more fasteners; a snap fit, a friction fit and/or an interference fit; one or more adhesives; and/or any other suitable means. To facilitate the alignment of this structure and the housing 18, some or all of these components and/or the housing 18 may include one or more interlocking portions, such inwardly extending portions and outwardly extending portions that may interlock with each other. For example, as shown in FIG. 3, one or more of the connector blocks 26, 28 may include one or more notches 70, and the housing 18 may include one or more projections 72, which may be at least partially disposed within and/or interlock with the notches 70 as shown in FIG. 1. Also, for example, as shown in FIG. 3, the housing 18 may include one or more notches 74, and one or more of the connector blocks 26, 28 may include one or more projections 76, which may be at least partially disposed within and/or interlock with the notches 74 as shown in FIG. 1. Moreover, for example, as shown in FIG. 3, one or more of the connector blocks 26, 28 may include one or more slots or channels 78, and the housing 18 may include one or more projections 80, which may be at least partially disposed within and/or interlock with the slots or channels 78. The interlocking portions may have a variety of other suitable shapes, sizes and/or configurations. Of course, slots, channels, notches, projections or other types of interlocking portions are not required.

Desirably, because all or at least a portion of the ports 12, 14 may be formed or otherwise included in the connector blocks 26, 28, the structure of the connector blocks 26, 28; optical subassemblies 30, 32; the printed circuit board 34; and the flex circuits 36, 38 may be connected to and/or housed within a variety of different housings of various communications devices 10. This may help provide greater number of uses for this structure. Moreover, if this structure and/or the connector blocks 26, 28 are removably connected to the housing 18 (for example, using one or more fasteners), this may allow the ports 12, 14 to be more easily altered and/or repaired.

Returning to FIGS. 6-7, the body 46 and the mount 48 may include one or more interlocking and/or generally complementary portions. For example, the mount 48 may include one or more openings 82, and the body 46 may include one or more projections 84 (such as, posts), which may be at least partially disposed within, inserted through and/or interlock with the openings 82. In addition, the mount 48 may also include one, two, three, four or more flaps or flanges 86, and the body 46 may include one or more portions that may contact, abut, engage and/or be generally complementary to the flaps or flanges 86 and/or the side 60 of the recessed portion 52 of the mount 48.

In further detail, as shown in FIGS. 6-7, the body 46 may include one, two, three, four or more projections 88 that may contact, abut, engage and/or be generally complementary to the flaps or flanges 86 and/or the side 60 of the recessed portion 52 of the mount 48. For example, the side 60 of the recessed portion 52 may have a generally curved shape (such as circular or oval), and portions 90 of the projections 88 may have a generally curved shape (such as a concave shape) that may contact, abut, engage and/or be generally complementary to the generally curved shape of the side 60 of the recessed portion 52. In addition, a projection 88 may include a first portion and a second portion that may contact, abut, engage and/or be generally complementary to a first flap or flange 86 and a second flap or flange 86, respectively. The interlocking and/or generally complementary portions of the body 46 and the mount 48 may have a variety of other suitable shapes, sizes and/or configurations. The body 46 and the mount 48, however, do not require any openings, projections or other types of interlocking and/or generally complementary portions.

To secure the mount 48 to the body 46, the projections 84 may be deformed, deflected and/or swaged after the projections 84 are at least partially inserted through the openings 82. For example, after insertion, the projections 84 may be at least partially melted, which may cause at least a portion of the projections 84 to flow or otherwise move to portions of the mount 48 that surround and/or abut its openings 82. As shown in FIG. 7, this may seal the openings 82 and/or may sandwich portions of the mount 82 between the projections 88 and the melted portions of the projections 84. The projections 84, however, need not be deformed, deflected and/or swaged to secure the mount 48 to the body 46. In addition, the body 46 and the mount 48 may be connected to each other using one or more fasteners; a snap fit, a friction fit and/or an interference fit; one or more adhesives; and/or any other suitable means.

Figure 11:
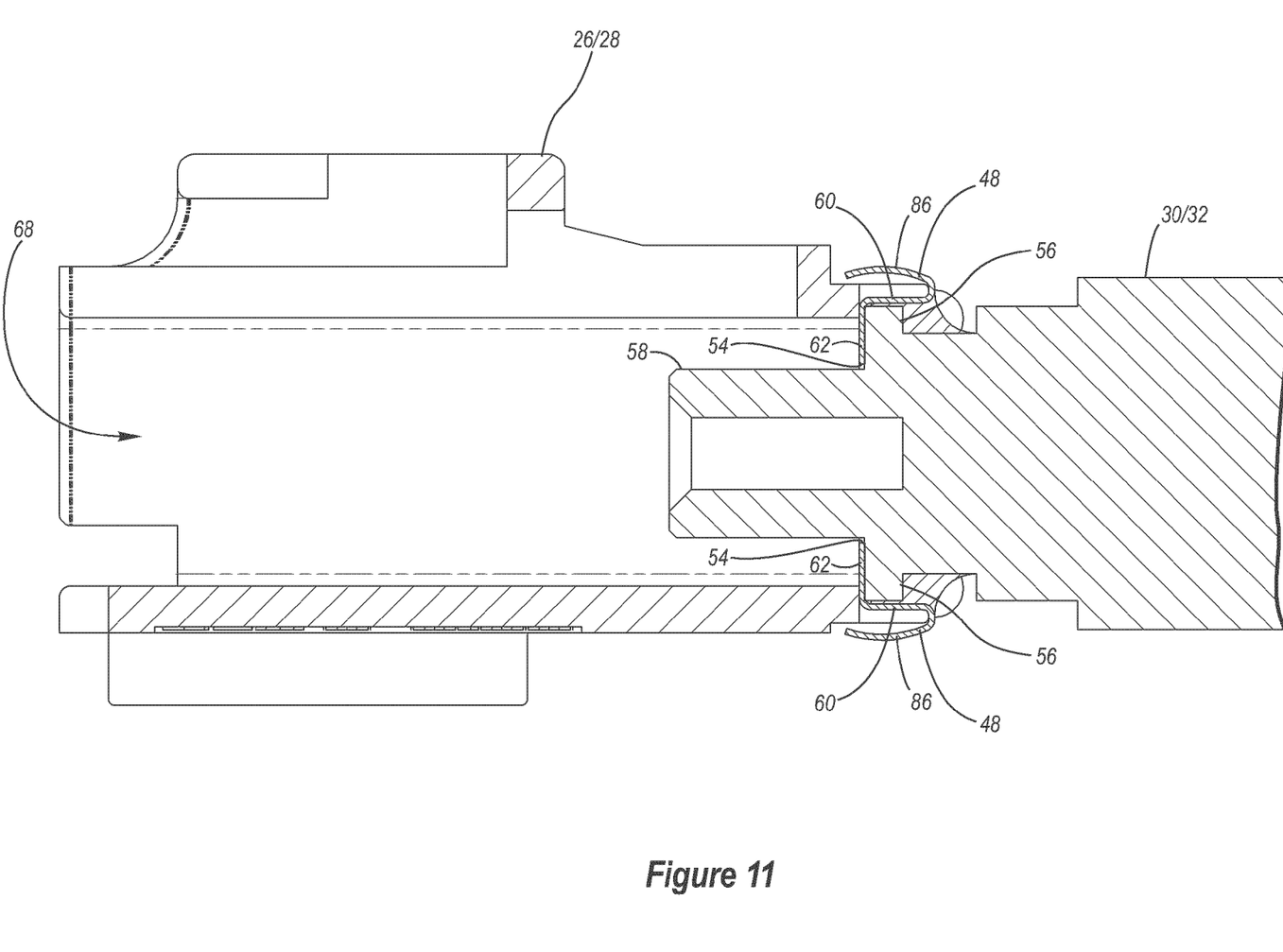
FIG. 11 is a cross-sectional view of a portion of the communications device shown in FIG. 10.

As shown in FIG. 11, the flaps or flanges 86 of the mount 48 may have a generally curved shape, which may be generally convex, and may be positioned at about a ninety degree angle relative to a front portion 92 of the mount 48, as shown in FIGS. 6-7. In addition, as shown in FIGS. 6-7, the flaps or flanges 86 may be arranged in a generally rectangular or square arrangement. The flaps or flanges 86, however, may have other suitable shapes, positions and/or arrangements, if desired.

Figure 10:
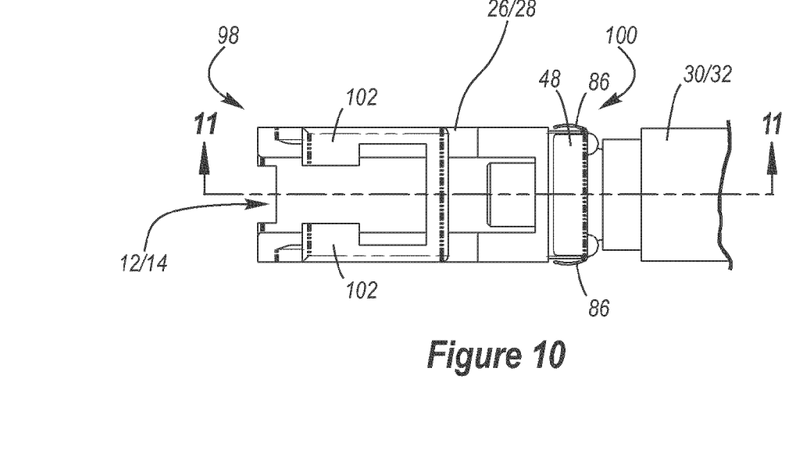
FIG. 10 is a top view of the portion of the communications device shown in FIG. 8.

As shown in FIGS. 9-11, a mount 48 may be positioned generally between a connector block 26, 28 and an optical subassembly 30, 32 and, if desired, the mount 48 may be an electromagnetic interference ("EMI") shield. If configured as an EMI shield, the mount 48 may intercept electromagnetic interference that may be produced, for example, by the communications device 10 during use. Thus, this may help reduce overall electromagnetic interference produced by such use.

Significantly, the mount 48 may help better interconnect and/or align the optical subassembly 30, 32 with the connector block 26, 28, as discussed above. This may allow the opening 54 of the mount 48 to be more tightly fit around the optical subassembly's nosepiece 58. In addition, because the optical subassembly 30, 32 may be secured to the connector block 26, 28 prior to their collective placement within the housing 18, as discussed above, the opening 54 of the mount 48 may be even more tightly fit around the optical subassembly's nosepiece 58. Significantly, when the mount 48 is configured as an EMI shield, this tighter fit may advantageously help the mount 48 intercept a greater amount of electromagnetic interference.

In some embodiments, the nosepiece 58 may have a diameter and the opening 54 may have diameter that is less than or equal to about 0.2 millimeters larger than the diameter of the nosepiece 58. For example, nosepiece 58 may, for example, have a diameter of about 3 millimeters and the opening 54 may have diameter that is less than or equal to about 3.2 millimeters. If desired, the opening 54 may have diameter that is less than or equal to about 1 millimeter, 0.8 millimeters, 0.6 millimeters, 0.4 millimeters and/or 0.2 millimeters larger than the diameter of the nosepiece 58. In addition, in some embodiments, the opening 54 may have a cross-sectional area and the nosepiece 58 may have a cross-sectional area that is at least about seventy-five percent, seventy-eight percent, eighty-three percent, eighty-eight percent and/or ninety-three percent of the area of the opening. The opening 54 and the nosepiece 58, of course, may have different sizes, if desired.

As shown in FIG. 4, when installed within the housing 18, the mounts 48 may contact and/or engage each other and/or one or more portions of the housing. In further detail, the mount 48 of the connector block 26 may include first, second, third and fourth flaps or flanges 86; and the mount 48 of the connector block 28 may include first, second, third and fourth flaps or flanges 86. When installed within the housing, the first flaps or flanges 86 may contact and/or engage each other. In addition, when installed within the housing, the second flaps or flanges 86 may contact and/or engage a sidewall 94 of the shell 22 (FIG. 3); the third flaps or flanges 86 may contact and/or engage a lower wall 96 of the shell 22 (FIG. 3); and the fourth flaps or flanges 86 may contact and/or engage the cover 24.

The first, second, third and/or fourth flaps or flanges 86 may resiliently deform and/or deflect when this contact and/or engagement occurs. For example, as discussed above, the flaps or flanges 86 may have a generally curved shape. The generally curved shape may allow the flaps or flanges 86 to resiliently deform and/or deflect when the contact and/or engagement occurs. This resilient deformation and/or deflection of the flaps or flanges 86 may desirably help them maintain this contact and/or engagement by exerting a force against the structures that they contact and/or engage.

When the mount 48 is configured as an EMI shield, this contact and/or engagement may help provide an electrically conductive path between the mounts 48 and/or the housing 18, which may help intercept a greater amount of electromagnetic interference. To help provide the conductive path, the mounts 48 and/or the housing 18 may be constructed of an electrically conductive material, such as metal or other electrically conductive material. A mount 48, for example, may be constructed from sheet metal and may be formed using stamping, molding and/or other suitable manufacturing processes.

When the mount 48 is configured as an EMI shield, an electrically conductive material may be positioned between the flange's side 64 and the recessed portion's side 60 and/or between the flange's end 66 and the recessed portion's end 62. For example, an electrically conductive adhesive may be positioned between the flange's side 64 and the recessed portion's side 60 and/or between the flange's end 66 and the recessed portion's end 62. Also, for example, an electrically conductive washer or gasket (such as, an electrically conductive, pressure-sensitive adhesive washer or gasket) may be positioned between the flange's end 66 and the recessed portion's end 62. Significantly, the electronically conductive material may help the mount 48 intercept a greater amount of electromagnetic interference. The mount 48, however, need not be configured as an EMI shield.

As illustrated above, the body 46 and the mount 48 of a connector block 26, 28 may be discrete structures. The body 46 and the mount 48, however, need not be discrete structures, if desired. For example, the mount 48 may be integrally formed in the body 46 as part of monolithic structure via a die-casting process and/or other suitable manufacturing processes.

As best seen in FIGS. 10-11, a connector block 26, 28 may include a passageway that may extend from a front portion 98 of the connector block 26, 28 to a rear portion 100 of a connector block and may define an optical path 68 through which optical signals may pass. For example, the passageway may form part of a socket of a port 12, 14, which socket may be sized and configured to receive at least a portion of an optical fiber plug (such as, an LC-type optical fiber plug or other optical fiber plug) of an optical fiber connector to which the communications device 10 may be coupled. With the at least a portion of the optical fiber plug received by the socket of the port 12, 14, an optical fiber of the optical fiber plug may be aligned with an optical subassembly 30, 32 to permit the communications device 10 to use the optical subassembly 30, 32 to communicate via the optical fiber. If desired, the connector block 26, 28 may include one or more tabs 102, which may be sized and configured to receive a resilient clip of the optical fiber connector to help secure the optical fiber connector to the communications device 10. The tabs 102, however, are not required.

The methods and systems described above require no particular component or function. Thus, any described component or function—despite its advantages—is optional. Also, some or all of the described components and functions described above may be used in connection with any number of other suitable components and functions.

The present invention may be embodied in other specific forms without departing from its spirit or essential characteristics. The described embodiments are to be considered in all respects only as illustrative, not restrictive. The scope of the invention is, therefore, indicated by the appended claims rather than by the foregoing description. All changes that come within the meaning and range of equivalency of the claims are to be embraced within their scope.

What is claimed is:

1. An apparatus comprising:
   a transmitter optical subassembly comprising:
   a front portion including an end; and
   a nosepiece configured to convey optical signals, the nosepiece extending away from the end of the front portion of the transmitter optical subassembly;
   a receiver optical subassembly comprising:
   a front portion including an end; and
   a nosepiece configured to convey optical signals, the nosepiece extending away from the end of the front portion of the receiver optical subassembly;
   a first monolithic body including a port that is sized and configured to couple an optical fiber plug;
   a first EMI shield connected to the first monolithic body and to the transmitter optical subassembly, the first EMI shield including a recessed portion that includes an end and an opening formed in the end, the end of the recessed portion of the first EMI shield abutting the end of the front portion of the transmitter optical subassembly, the nosepiece of the transmitter optical subassembly extending through the opening formed in the end of the recessed portion of the first EMI shield;
   a second monolithic body including a port that is sized and configured to couple an optical fiber plug; and
   a second EMI shield connected to the second monolithic body and to the receiver optical subassembly, the second EMI shield including a recessed portion that includes an end and an opening formed in the end, the end of the recessed portion of the second EMI shield abutting the end of the front portion of the receiver optical subassembly, the nosepiece of the receiver optical subassembly extending through the opening formed in the end of the recessed portion of the second EMI shield; wherein the first EMI shield includes one or more resiliently deformable or resiliently deflectable members; and wherein the second EMI shield includes one or more resiliently deformable or resiliently deflectable members that contact the one or more resiliently deformable or resiliently deflectable members of the first EMI shield.

2. The apparatus as in claim 1, further comprising a housing that houses at least a portion of the transmitter optical subassembly, at least a portion of the receiver optical subassembly, at least a portion of the first monolithic body, at least a portion of the first EMI shield, at least a portion of the second monolithic body, and at least a portion of the second EMI shield.

3. The apparatus as in claim 2, wherein the first EMI shield includes one or more resiliently deformable members that contact the housing; and wherein the second EMI shield includes one or more resiliently deformable members that contact the housing.

4. The apparatus as in claim 2, wherein the first EMI shield includes one or more resiliently deflectable members that contact the housing; and wherein the second EMI shield includes one or more resiliently deflectable members that contact the housing.

5. An apparatus comprising:
a transmitter optical subassembly including a nosepiece configured to convey optical signals;
a receiver optical subassembly including a nosepiece configured to convey optical signals;
a first body including a port that is sized and configured to couple an optical fiber plug;
a first EMI shield connected to the first body, the first EMI shield including an opening and one or more resilient members, the nosepiece of the transmitter optical subassembly extending through the opening of the first EMI shield;
a second body including a port that is sized and configured to couple an optical fiber plug; and
a second EMI shield connected to the second body, the second EMI shield including an opening and one or more resilient members, the nosepiece of the receiver optical subassembly extending through the opening of the second EMI shield, at least one resilient member of the second EMI shield contacting at least one resilient member of the first EMI shield.

6. The apparatus as in claim 5, wherein the first EMI shield is a mount to which the transmitter optical subassembly is connected; and wherein the second EMI shield is a mount to which the receiver optical subassembly is connected.

\* \* \* \* \*